(12) United States Patent
Suwa

(10) Patent No.: US 9,479,318 B2
(45) Date of Patent: Oct. 25, 2016

(54) CHANNEL DETERMINATION METHOD AND WIRELESS COMMUNICATION APPARATUS

(71) Applicant: Panasonic Intellectual Property Management Co., Ltd., Osaka (JP)

(72) Inventor: Yutaka Suwa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 78 days.

(21) Appl. No.: 14/318,037

(22) Filed: Jun. 27, 2014

(65) Prior Publication Data

US 2015/0003344 A1 Jan. 1, 2015

(30) Foreign Application Priority Data

Jun. 28, 2013 (JP) ................................. 2013-136756
Jun. 28, 2013 (JP) ................................. 2013-136766
Jun. 28, 2013 (JP) ................................. 2013-136768

(51) Int. Cl.
*H04L 5/00* (2006.01)
*H04W 16/14* (2009.01)
*H04L 27/00* (2006.01)

(52) U.S. Cl.
CPC ......... *H04L 5/0062* (2013.01); *H04L 27/0006* (2013.01); *H04W 16/14* (2013.01)

(58) Field of Classification Search
None
See application file for complete search history.

(56) References Cited

U.S. PATENT DOCUMENTS

| 6,853,842 | B1 * | 2/2005 | Wilson .................. H04W 16/18 455/423 |
| 7,110,374 | B2 | 9/2006 | Malhotra et al. |
| 7,684,757 | B2 | 3/2010 | Mikami et al. |
| 7,808,950 | B2 | 10/2010 | Kizu et al. |
| 8,526,884 | B1 * | 9/2013 | Price ..................... H04W 8/005 455/41.2 |
| 8,634,317 | B1 * | 1/2014 | Yu .......................... H04L 47/10 370/252 |
| 2002/0039888 | A1 | 4/2002 | Hama |
| 2002/0181417 | A1 | 12/2002 | Malhotra et al. |
| 2003/0181211 | A1 | 9/2003 | Razavilar et al. |
| 2006/0079183 | A1 | 4/2006 | Song et al. |
| 2006/0089149 | A1 | 4/2006 | Kizu et al. |

(Continued)

FOREIGN PATENT DOCUMENTS

EP 1 067 812 A2 1/2001
EP 1 404 071 A2 3/2004

(Continued)

OTHER PUBLICATIONS

Extended European Search Report dated Feb. 20, 2015, for corresponding EP Application No. 14172975.6-1857, 6 pages.

*Primary Examiner* — Kodzovi Acolatse
(74) *Attorney, Agent, or Firm* — Seed IP Law Group LLP

(57) ABSTRACT

A channel determination method is disclosed that can avoid performance deterioration caused by interference even in a situation in which radio waves from other communication apparatuses including a microwave oven using the same frequency band are mixed. This method detects a predetermined preamble in a received signal when performing carrier sensing while switching between reception frequencies of a receiving section. The method examines, using a counter, how often electric field strength exceeds a predetermined threshold for each channel during the carrier sensing, disables, upon detecting a signal from another 802.11 apparatus, a channel from which the signal is detected and also disables a channel for which the counter shows a count value exceeding the threshold.

2 Claims, 15 Drawing Sheets

(56) References Cited

U.S. PATENT DOCUMENTS

| | | |
|---|---|---|
| 2006/0141956 A1 | 6/2006 | Mikami et al. |
| 2010/0020711 A1* | 1/2010 | Horisaki .............. H04L 12/413 370/252 |
| 2010/0037124 A1 | 2/2010 | Hoshi et al. |
| 2012/0213110 A1 | 8/2012 | Yamaguchi |
| 2013/0189929 A1 | 7/2013 | Takahashi et al. |
| 2013/0208587 A1* | 8/2013 | Bala .................... H04W 16/14 370/230 |
| 2014/0153378 A1 | 6/2014 | Ishihara et al. |

FOREIGN PATENT DOCUMENTS

| | | |
|---|---|---|
| EP | 2 217 030 A1 | 8/2010 |
| JP | 2002-033676 A | 1/2002 |
| JP | 2002-111603 A | 4/2002 |
| JP | 2003-037607 A | 2/2003 |
| JP | 2004-357056 A | 12/2004 |
| JP | 2005-278052 A | 10/2005 |
| JP | 2005-323032 A | 11/2005 |
| JP | 2005-333510 A | 12/2005 |
| JP | 2006-109448 A | 4/2006 |
| JP | 2006-128812 A | 5/2006 |
| JP | 2006-186916 A | 7/2006 |
| JP | 2008-054303 A | 3/2008 |
| JP | 2008-078698 A | 4/2008 |
| JP | 2010-193446 A | 9/2010 |
| JP | 4886647 B2 | 2/2012 |
| JP | 2012-078172 A | 4/2012 |
| JP | 2012-175545 A | 9/2012 |
| JP | 2012-235506 A | 11/2012 |
| JP | 2013-240112 A | 11/2013 |
| WO | 2013/008291 A1 | 1/2013 |

\* cited by examiner

| CHANNEL | CUMULATIVE COUNT VALUE | CUMULATIVE CCA VALUE | WEIGHTING PARAMETER | ENABLED/DISABLED |
|---|---|---|---|---|
| 1Ch | | | | |
| 2Ch | | | | |
| 3Ch | | | | |
| 4Ch | | | | |
| 5Ch | | | | |
| 6Ch | | | | |
| 7Ch | | | | |
| 8Ch | | | | |
| 9Ch | | | | |
| 10Ch | | | | |
| 11Ch | | | | |
| 12Ch | | | | |
| 13Ch | | | | |

CHANNEL DETERMINATION METHOD AND WIRELESS COMMUNICATION APPARATUS

TECHNICAL FIELD

The present invention relates to a channel determination method and a wireless communication apparatus capable of avoiding performance deterioration caused by interference from communication with other communication apparatuses using the same frequency band, for example.

BACKGROUND ART

In recent years, wireless LAN apparatuses using the IEEE802.11 standard have been widely used as radio network devices. The application range of the wireless LAN apparatuses is expanding from conventional use for personal computers to use for portable devices including mobile phones. There is a high demand for power-saving and highly efficient communication in these portable devices in particular. In the present specification, the IEEE802.11 standard will be referred to as "802.11 standard."

The 2.4 GHz band among frequency bands used by wireless LAN apparatuses compliant with the 802.11 standard can be operated without licenses, for example, in Japan, and many wireless network apparatuses are being standardized. For example, Bluetooth (Bluetooth is a registered trademark), which employs a frequency hopping scheme (FHSS: Frequency Hopping Spread Spectrum), is widespread as wireless apparatuses using the 2.4 GHz band. Moreover, at ordinary homes, microwave ovens emit electromagnetic wave noise in the 2.4 GHz band and cordless telephone sets of other frequency hopping schemes also use the 2.4 GHz band.

FIG. 15A illustrates the 2.4 GHz band used in the 802.11 standard. A wireless LAN (wireless apparatus) of the 802.11 standard selects a use channel from among 13 channels set at intervals of 5 MHz, and performs carrier sensing multiple access (CSMA) in the physical layer. In CSMA, the wireless apparatus carrier-senses the band before transmission, performs transmission if no signal from other devices is detected and refrains from transmission if a signal higher than a certain threshold level is detected. In the 802.11 standard in particular, it is necessary to abide by a rule called "clear channel assessment (CCA)" associated with preamble detection. In CCA, when carrier sensing is performed on a certain channel and if a preamble of a signal emitted from another apparatus of the 802.11 standard is detected, such a situation is considered CCA busy regardless of the received electric field strength, and the wireless apparatus must refrain from using the channel. That is, while another nearby 802.11 standard apparatus is performing transmission, the wireless apparatus cannot perform transmission even when the received electric field strength is small.

Moreover, the 802.11 standard defines that an interval equivalent to two or more channels should be kept between apparatuses in order to prevent inter-channel interference with other 802.11 standard devices. When, for example, a signal that seems to be transmitted from another 802.11 standard device is detected on [Ch1], adjacent [Ch2] and [Ch3] cannot be used. On the other hand, when a signal that seems to be transmitted from another 802.11 standard device is detected on [Ch5], adjacent [Ch4], [Ch6] and [Ch7] cannot be used.

FIG. 15B illustrates a situation in which a Bluetooth (BT) signal is causing interference among 802.11 channels. In Bluetooth, carrier sensing is also performed before determining a channel to be used, and a channel to be used is determined in FHSS. However, overlapping with a frequency used by the 802.11 standard occurs at a certain probability and interference caused by the overlapping cannot be avoided. The threshold used in carrier sensing of Bluetooth is not as stringent as that of the 802.11 standard. For this reason, even when a signal of another apparatus having a higher level than the level at which the 802.11 standard withholds transmission is detected, transmission may be performed if the level is equal to or lower than a threshold defined in Bluetooth. Thus, although the use of 2.4 GHz band requires no licenses, if another wireless apparatus such as a Bluetooth device, or a microwave oven is located in the neighborhood, radio wave interference may reduce performance in terms of communication speed, and if a Bluetooth device starts transmission or a microwave oven starts operation in the neighborhood, there may a situation where transmission cannot be started until the interference source no longer exists.

When a microwave oven is used in the neighborhood, a strong interfering wave of the 2.4 GHz band is emitted intermittently. During a period of emission of the interfering wave, an 802.11 standard apparatus cannot start radio communication within a range affected by the interfering wave. For this reason, in order to achieve power-saving and highly efficient radio communication using the 2.4 GHz band, it is important for the wireless communication apparatus to detect an interfering wave emitted from a microwave oven and select a use channel while evaluating the magnitude of influence on communication of the wireless communication apparatus.

Conventionally, the following wireless communication apparatuses are used to predict this kind of a microwave oven interfering wave (e.g., PTL 1). In the case of an interfering wave emitted from an ordinary microwave oven, a period during which an interfering wave is emitted with a high frequency and a period during which no interfering wave is emitted are periodically repeated in synchronization with a frequency of a commercial AC power supply or a frequency of an integer multiple thereof during operation of the microwave oven. In the wireless communication apparatus shown in PTL 1, if a received radio wave is from a microwave oven, an RSSI signal indicating the intensity of the received radio wave received via an antenna indicates periodicity made up of a period during which interfering wave is emitted with a high frequency and a period during which no interfering wave is emitted. According to PTL 1, the wireless communication apparatus can detect, through detection of the periodicity of the RSSI signal, timing at which an interfering wave is emitted and timing at which an interfering wave stops, and can thereby predict a time zone in which the microwave oven emits an interfering wave.

In addition, PTL 2 discloses a wireless communication apparatus that detects, when selecting a communication channel to be used by a base station apparatus (base station) from among a plurality of channels, a channel being used by another base station apparatus first, and then detects the received signal intensity of a radio wave transmitted from the other base station apparatus on the detected channel in use, and selects, when there is no communication channel whose received signal intensity falls to or below a predetermined value over a predetermined bandwidth, a communication channel to be used by the base station apparatus in accordance with the received signal intensity of the channel in use.

Moreover, PTL 3 discloses a wireless communication apparatus that measures, when a base station appropriately selects a combination of channels to be used, the intensity of a received signal of a radio wave detected in an operating frequency band, extracts the measured data corresponding to a base station in another radio communication system from the measured data of the received signal intensity, calculates an index value indicating received signal intensity of an interference signal of each channel based on the received signal intensity included in the extracted measure data, performs weighting addition on index values of the respective channels based on a predetermined inter-channel interference table, and selects a channel combination having a minimum influence of interference from the predetermined channel combination configured of frequency channels without frequency overlapping based on the level of interference among the respective frequency channels.

CITATION LIST

Patent Literature

PTL 1
Japanese Patent Application Laid-Open No. 2002-111603
PTL 2
Japanese Patent Application Laid-Open No. 2012-175545
PTL 3
Japanese Patent Publication No. 4886647

SUMMARY OF INVENTION

Technical Problem

In such a situation in which the above-described conventional wireless communication apparatus recognizes, as a received radio wave, a radio wave which is a mixture of a variety of radio waves including radio communication in addition to a microwave oven as shown in FIG. 15, it is difficult to detect the periodicity of interfering wave emitted from the microwave oven, however. If the interfering wave is mixed with other signals, the apparatus may select a channel that overlaps with the channel of the microwave oven without being able to detect the operation of the microwave oven.

The present invention aims to solve the problems with the above-described conventional wireless communication apparatuses and to provide a channel determination method and a wireless communication apparatus that avoid errors and achieve high efficiency radio communication even in a situation where a radio wave including a mixture of a variety of radio waves including a microwave oven is recognized as a received radio wave.

Solution to Problem

A channel determination method according to an aspect of the present invention is a method in a carrier sensing operation performing a signal receiving operation while switching between reception frequencies of a receiving section, the method including: determining whether or not electric field strength of a received signal exceeds a predetermined threshold; detecting a predetermined preamble in received data during the carrier sensing operation; determining to enable or disable a channel in which the predetermined preamble is detected in the received data, in accordance with the electric field strength of the signal; causing a counter to count up when the electric field strength of the received signal exceeds a predetermined threshold and causing the counter to count down when the electric field strength of the received signal does not exceed the predetermined threshold for each channel during the carrier sensing operation; and disabling each channel when the count value of the counter of a corresponding one of the channels reaches a predetermined value.

A channel determination method according to an aspect of the present invention is a method in a carrier sensing operation performing a signal receiving operation while switching between reception frequencies of a receiving section, the method including: detecting a predetermined preamble in received data during the carrier sensing operation; detecting, when the predetermined preamble is detected, whether or not a received signal is a predetermined beacon; disabling, when the predetermined preamble is detected in the received data and the received signal is detected to be the predetermined beacon, the channel from which the preamble is detected; disabling a number of channels adjacent to the channel from which the preamble is detected, the number corresponding to a signal level of the signal from which the preamble is detected; determining, when the predetermined preamble is not detected in the received data, whether or not electric field strength of the received signal exceeds a predetermined threshold; causing the counter to count up when the electric field strength of the received signal exceeds the predetermined threshold and causing the counter to count down when the electric field strength of the received signal does not exceed the predetermined threshold for each channel; and disabling each channel when the count value of the counter of a corresponding one of the channels reaches a predetermined value.

A channel determination method according to an aspect of the present invention is method in a carrier sensing operation performing a signal receiving operation while switching between reception frequencies of a receiving section, the method including: detecting a predetermined preamble in received data during the carrier sensing operation; detecting, when the predetermined preamble is detected, whether or not a received signal is a predetermined beacon; accumulating a CCA value calculated based on information on signal intensity of the received signal relating to the channel from which the preamble is detected and recording the accumulated CCA value as a cumulative CCA value in a recording section; disabling, when the predetermined preamble is detected in the received data and the received signal is detected to be the predetermined beacon, the channel from which the preamble is detected; disabling a number of channels adjacent to the channel from which the preamble is detected, the number corresponding to a signal level of the signal from which the preamble is detected; and determining, based on the cumulative CCA value, whether to enable or disable a channel from which the predetermined preamble is detected in the received data and in which the received signal is not detected to be the predetermined beacon.

A wireless communication apparatus according to an aspect of the present invention is an apparatus including: a receiving section; a received wave intensity determination section that determines whether or not electric field strength of a signal received by the receiving section exceeds a predetermined threshold; a counter that counts down when a determination value of the received wave intensity determination section does not exceed the predetermined threshold and counts up when the determination value of the received wave intensity determination section exceeds the predetermined threshold for a channel from which a predetermined preamble is detected in received data obtained from the received signal in a carrier sensing operation; and a determination section that disables each channel when the count value of the counter of a corresponding one of the channels reaches a predetermined value.

A wireless communication apparatus according to an aspect of the present invention is an apparatus including: a transmitting section that transmits a signal; a receiving section that receives a signal; a received wave intensity determination section that determines whether or not electric field strength of the signal received by the receiving section exceeds a predetermined threshold during a carrier sensing operation performing a signal receiving operation while switching between reception frequencies of the receiving section; a demodulation section that demodulates the received signal and outputs the demodulated signal as received data; a CCA detection section that detects a predetermined preamble in the received data during the carrier sensing operation; a counter that counts up when the received wave intensity determination section determines that electric field strength of the signal exceeds the predetermined threshold and counts down when the electric field strength of the signal does not exceed the predetermined threshold for each channel during the carrier sensing operation; and a determination section that disables, when the CCA detection section detects a signal from another apparatus, a channel from which the signal is detected and a channel adjacent to the channel from which the signal is detected, and disables each channel when the count value of the counter of a corresponding one of the channels exceeds a threshold.

Advantageous Effects of Invention

According to the present invention, it is possible to avoid errors and to achieve high efficiency radio communication even in a situation in which a variety of radio waves from wireless communication apparatuses of different standards including a microwave oven or the like are mixed.

BRIEF DESCRIPTION OF DRAWINGS

FIG. 3 illustrates how information is recorded for each channel in a communication control section of the wireless communication apparatus according to the embodiment of the present invention;

FIG. 12 illustrates a weak electric field detection mode of the wireless communication apparatus according to the embodiment of the present invention;

DESCRIPTION OF EMBODIMENT

Hereinafter, an embodiment of the present invention will be described in detail with reference to the accompanying drawings.

Figure 1:
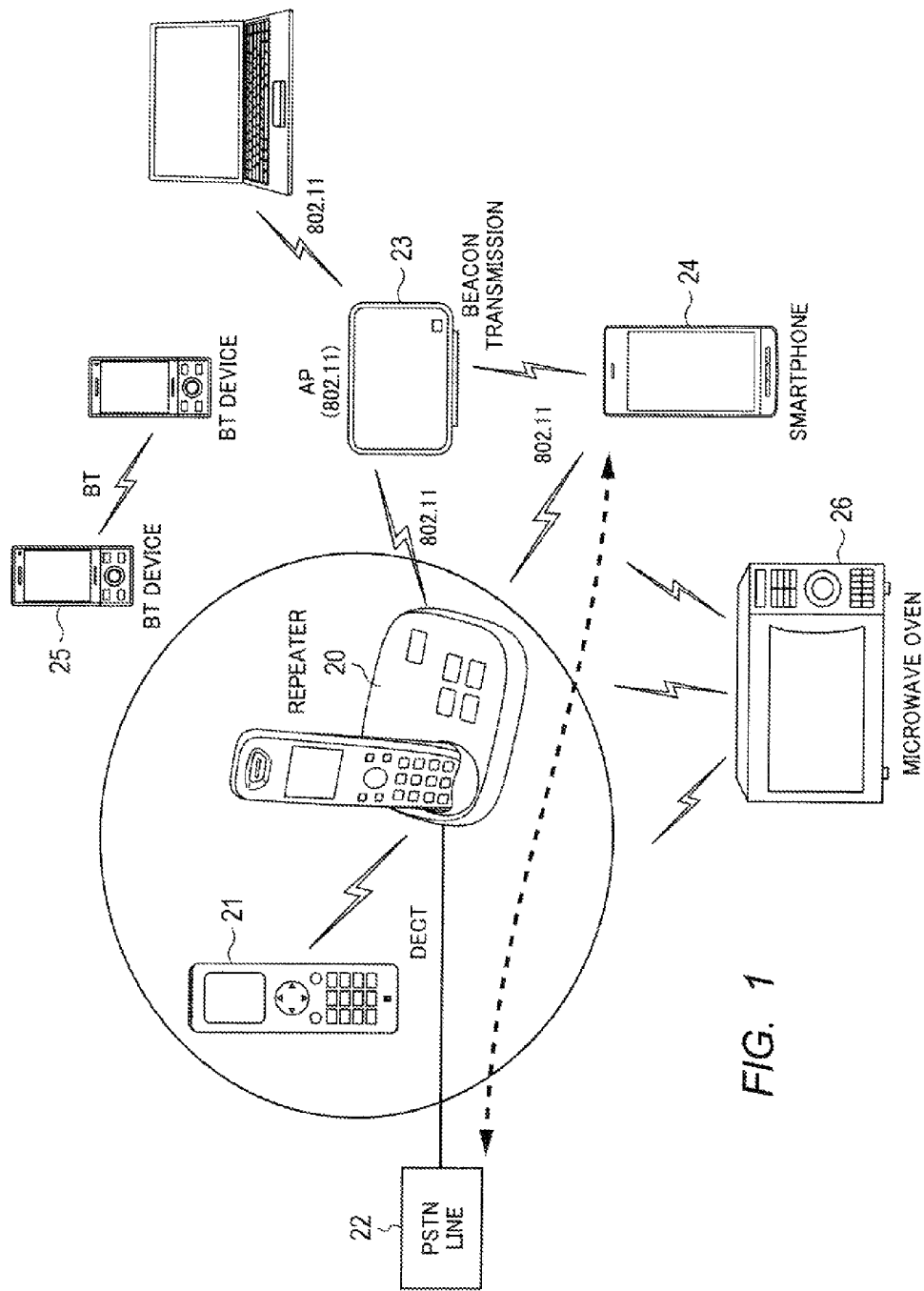
FIG. 1 is a system configuration diagram when an embodiment is applied to a base unit of a cordless telephone set as an embodiment of a wireless communication apparatus of the present invention.

FIG. 1 illustrates a system configuration when an embodiment is applied to a base unit of a cordless telephone set as an embodiment of a wireless communication apparatus of the present invention. Reference numeral 20 denotes the base unit of the cordless telephone set according to the present embodiment, 21 denotes a portable unit of the cordless telephone set communicable with base unit 20 through communication compliant with a DECT standard. Base unit 20 is wire-connected to PSTN line 22. Base unit 20 includes a function to serve as an 802.11 standard wireless LAN repeater.

Reference numeral 23 denotes an access point (AP) of the 802.11 standard wireless LAN, and 24 denotes a smartphone capable of carrying out communication via the 802.11 standard wireless LAN. Base unit 20 of the cordless telephone set of the present embodiment can communicate with smartphone 24 via the 802.11 standard wireless LAN. Base unit 20 of the cordless telephone set registers portable unit 21 communicable according to the DECT standard and smartphone 24 communicable according to the 802.11 standard as portable units, and allows smartphone 24 to be used as a portable unit. For example, base unit 20 enables speech conversation via the PSTN line using, for example, smartphone 24 and also allows smartphone 24 to be used for registration or editing of a telephone directory.

In FIG. 1, base unit 20 is located at a place where a communication signal from another communication device that overlaps with a wireless LAN band, for example, Bluetooth device (BT device) 25 (Bluetooth is a registered trademark), and that interferes with a radio wave from microwave oven 26.

Figure 2:
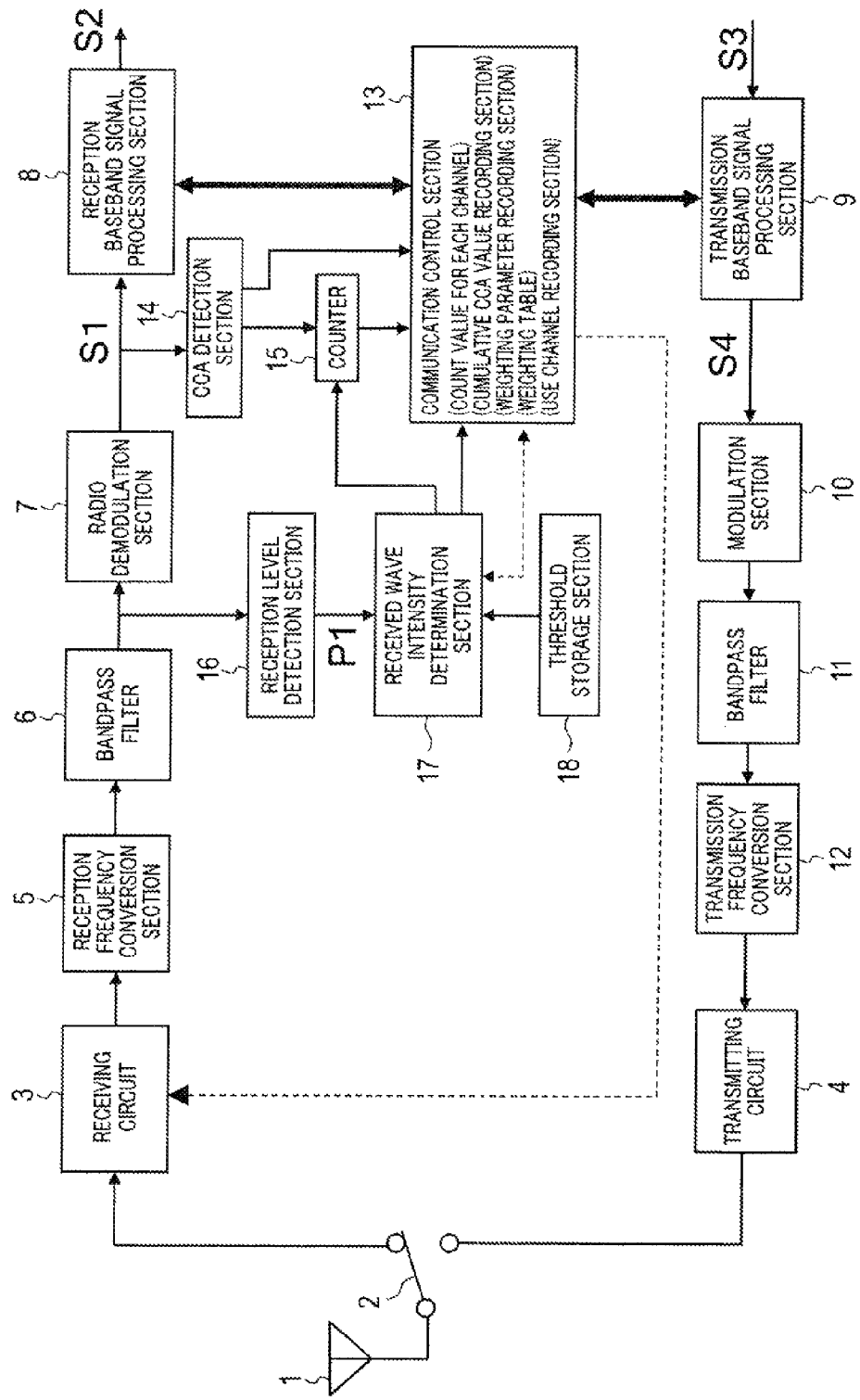
FIG. 2 is a block diagram illustrating a configuration of a wireless communication apparatus according to the embodiment of the present invention that performs communication according to the 802.11 standard.

FIG. 2 is a block diagram illustrating a configuration of base unit 20 according to the embodiment of the present invention that performs communication according to the 802.11 standard. In FIG. 2, reference numeral 1 denotes a transmitting and receiving antenna, 2 denotes a transmission and reception switching circuit, 3 denotes a receiving circuit in a radio receiving section and 4 denotes a transmitting circuit in a radio transmitting section.

In the radio receiving section, reference numeral 5 denotes a reception frequency conversion section, 6 denotes a bandpass filter that allows a signal of one-channel bandwidth compliant with the 802.11 standard to pass through the filter, 7 denotes a radio demodulation section and 8 denotes a reception baseband signal processing section.

In the radio transmitting section, reference numeral 9 denotes a transmission baseband signal processing section, 10 denotes a modulation section, 11 denotes a bandpass filter that restricts the bandwidth of a signal to a one-channel width, and 12 denotes a transmission frequency conversion section.

Receiving circuit 3 receives and amplifies a radio wave received from transmission and reception switching circuit 2. Reception frequency conversion section 5 performs frequency conversion. The frequency-converted signal is restricted by bandpass filter 6 to a bandwidth corresponding to one channel. Radio demodulation section 7 performs high frequency demodulation processing on the received signal that has passed through bandpass filter 6, generates reception baseband signal S1 and outputs it to reception baseband signal processing section 8.

Reception baseband signal processing section 8 receives reception baseband signal S1, performs baseband signal processing and media access control and generates received data S2. When a reception error occurs, reception baseband signal processing section 8 outputs information relating to a reception error to communication control section 13.

Transmission baseband signal processing section 9 receives transmission data S3, performs baseband signal processing, and outputs transmission baseband signal S4. Transmission baseband signal S4 is modulated into CDMA by modulation section 10 and up-converted to a transmission frequency band by transmission frequency conversion section 12. Transmitting circuit 4 performs predetermined amplification on the up-converted signal and generates a transmission radio wave. The transmission radio wave is emitted to the outside from the transmitting side output of transmission and reception switching circuit 2 via transmitting and receiving antenna 1.

Communication control section 13 controls communication of the 802.11 standard and also controls operation for carrier sensing and clear channel assessment (CCA) before starting communication.

CCA detection section 14 receives reception baseband signal S1 from radio demodulation section 7, detects a preamble of the 802.11 standard and passes the result to communication control section 13. Upon receiving information indicating that the preamble has been detected from CCA detection section 14 in carrier sensing before starting communication, communication control section 13 determines that the receiving channel at that time is used by a communication apparatus of the other 802.11 standard.

Counter 15 counts the number of times the received signal intensity exceeds a predetermined threshold for each channel during the carrier sensing operation. That is, counter 15 counts up when the received signal intensity exceeds the predetermined threshold and counts down when the received signal intensity falls below the predetermined threshold on the basis of information from received wave intensity determination section 17 which will be described later. The information from CCA detection section 14 and counter 15 is passed to communication control section 13.

Reception level detection section 16 measures signal intensity of the received signal band-limited by bandpass filter 6 and outputs value P1 of RSSI indicating the signal intensity. Received wave intensity determination section 17 determines whether value P1 of RSSI indicating the signal intensity exceeds a threshold or not and passes the determination result to communication control section 13 and counter 15.

Various thresholds for received wave intensity determination section 17 to make a determination are stored in threshold storage section 18. Threshold storage section 18 stores therein predetermined thresholds of received signal intensity during the carrier sensing operation and thresholds used for control of an interference detection mode and a weak electric field detection mode which will be described later.

The received radio wave is received by transmitting and receiving antenna 1, then inputted to bandpass filter 6 via receiving circuit 3 and subjected to band limitation. The received signal that has passed through bandpass filter 6 is subjected to demodulation processing by radio demodulation section 7.

Reception level detection section 16 outputs value P1 of RSSI indicating the received signal intensity, and received wave intensity determination section 17 determines whether value P1 of RSSI indicating the signal intensity has exceed a threshold or not. The determination result is passed to counter 15 according to a request. Threshold storage section 18 stores therein a threshold for received wave intensity determination section 17 to determine the signal intensity.

When CCA detection section 14 fails to detect a preamble of an IEEE802.11 standard packet (when no preamble is detected), communication control section 13 requests received wave intensity determination section 17 for the determination result of the received wave intensity at that time. Accordingly, received wave intensity determination section 17 determines whether the received wave intensity exceeds a threshold at that time or not and passes the determination result to counter 15.

Counter 15 counts up when the received wave intensity is determined to exceed the threshold and counts down when the received wave intensity is determined to fall below the threshold. For example, while a signal is received through channel 8, counter 15 counts up when the received radio wave including an interfering wave from, for example, a microwave oven through channel 8 is strong, and the value P1 of RSSI exceeds the threshold and repeats counting up when the interfering wave from the microwave oven continues. However, when the received wave intensity is determined at timing at which the interfering wave from the microwave oven discontinues, counter 15 counts down because the value P1 of RSSI does not exceed the threshold.

Communication control section 13 includes a count value recording section that records a count value for each channel acquired from counter 15, a cumulative CCA value recording section, and a weighting parameter recording section. The cumulative CCA value is a cumulative count value of the counter that counts up when CCA detection section 14 detects a preamble and the signal intensity of the received signal which is information of the signal intensity of the received signal acquired from intensity determination section 17 exceeds a predetermined threshold, and counts down when the electric field strength of the received signal does not exceed the predetermined threshold.

FIG. 3 illustrates a cumulative count value, cumulative CCA value, weighting parameter and information of the enabled/disabled status recorded for each channel in the storage section of communication control section 13. Communication control section 13 includes a weighting table which will be described later and an operating channel recording section that records the enabled/disabled status of each channel.

Counter 15 hands over information of the cumulative count value per channel to communication control section 13 and communication control section 13 records the cumulative count value per channel as shown in FIG. 3. When the cumulative count value of a certain channel exceeds a predetermined level through a carrier sensing operation in this way, communication control section 13 disables the channel.

Communication control section 13 receives information indicating that a preamble has been detected from CCA detection section 14 in the carrier sensing before starting communication, and thereby determines that the receiving channel thereof is used by another 802.11 standard communication apparatus. In this case, communication control section 13 acquires information on the signal intensity of the received signal band-limited by bandpass filter 6 from received wave intensity determination section 17 and records the CCA value calculated based on the information on the signal intensity in the cumulative CCA value recording section of the communication control section 13. The CCA values are accumulated and recorded in the cumulative CCA value recording section and channels whose cumulative CCA value exceeds a predetermined threshold are determined to be disabled.

When CCA detection section 14 successfully detects a preamble of an IEEE802.11 standard packet (a preamble is detected), communication control section 13 determines the channel to be disabled as described above. In this case, communication control section 13 need not acquire the cumulative count value from counter 15. Moreover, when CCA detection section 14 successfully detects a preamble, the cumulative count value of counter 15 may be forcibly reset.

Figure 4:
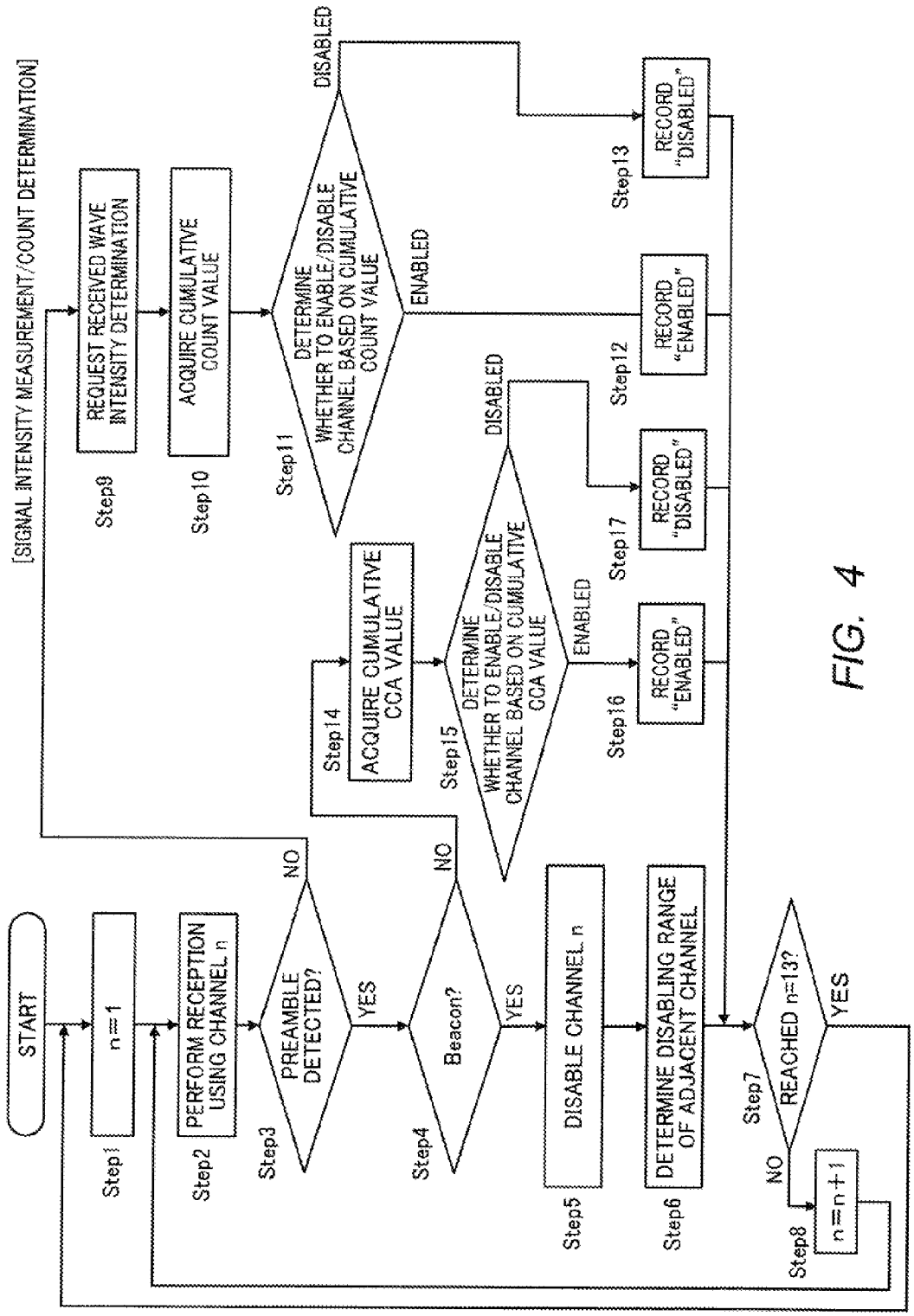
FIG. 4 is a flowchart for controlling a carrier sensing operation of the wireless communication apparatus according to the embodiment of the present invention.

FIG. 4 illustrates a flowchart for communication control section 13 to control each section to perform a carrier sensing operation.

In FIG. 4, n is a variable corresponding to the number of a receiving channel and n=1 is assumed in step 1 to start reception of channel 1 first. In step 2, communication control section 13 instructs receiving circuit 3 to receive signals on channel n. Here if n=1, receiving circuit 3 starts a receiving operation by causing the reception frequency to match channel 1.

In step 3, communication control section 13 examines whether or not the received signal includes a preamble of the IEEE802.11 standard packet. When it is determined based on the result of CCA detection section 14 that there is a preamble (step 3: YES), in step 4, communication control section 13 examines whether the received signal is a beacon of the IEEE802.11 standard or not.

When the signal received in step 4 is a beacon of the IEEE802.11 standard (step 4: YES), in step 5, communication control section 13 determines the channel to be disabled and records the result in the operating channel recording section in communication control section 13. In step 6, communication control section 13 determines to disable a number of adjacent channels adjacent to the channel in which the preamble is detected, the number of adjacent channels corresponding to the signal level of the signal from which the beacon is detected. Communication control section 13 then records the result in the operating channel recording section of communication control section 13 in step 6. For example, in the example in FIG. 5 which will be described later, when a beacon is detected in channel 5, channels 3 and 4, and channels 6 and 7 are determined to be disabled in addition to channel 5 from which a beacon is detected.

In step 7, communication control section 13 examines whether or not variable n corresponding to the number of the receiving channel has reached 13 which is the last number. When n does not reach 13 (step 7: NO), variable n is incremented in step 8 and the process returns to step 2 and communication control section 13 instructs receiving circuit 3 to perform reception in the next channel. When n reaches 13 (step 7: YES), the process returns to step 1 and sets n=1, and communication control section 13 instructs receiving circuit 3 to perform reception in the first channel (channel 1).

In aforementioned step 3, when no preamble of the IEEE802.11 standard packet is detected in the received signal (step 3: NO), the process moves to step 9, and communication control section 13 requests received wave intensity determination section 17 for the determination result of the received wave intensity then. Accordingly, received wave intensity determination section 17 determines whether the received wave intensity exceeds the threshold or not as described above and passes the determination result to counter 15 and counter 15 counts up or counts down.

Communication control section 13 acquires the cumulative count value from counter 15 in step 10 and determines whether to enable/disable the channel based on the cumulative count value thereof in step 11. When the channel is enabled in step 11, communication control section 13 records information "enabled" regarding the channel (step 12) and moves to step 7. When the channel is disabled in step 11, communication control section 13 records information "disabled" regarding the channel (step 13) and moves to step 7.

When no beacon of the IEEE802.11 standard is detected in the received signal in aforementioned step 4 (step 4: NO), communication control section 13 acquires the cumulative CCA value in step 14 and determines in step 15 whether to enable/disable the channel based on the cumulative CCA value.

When the channel is enabled in step 15, communication control section 13 records information "enabled" regarding the channel (step 16) and moves to step 7. When the channel is disabled in step 15, communication control section 13 records information "disabled" regarding the channel (step 17) and moves to step 7.

Figure 5:
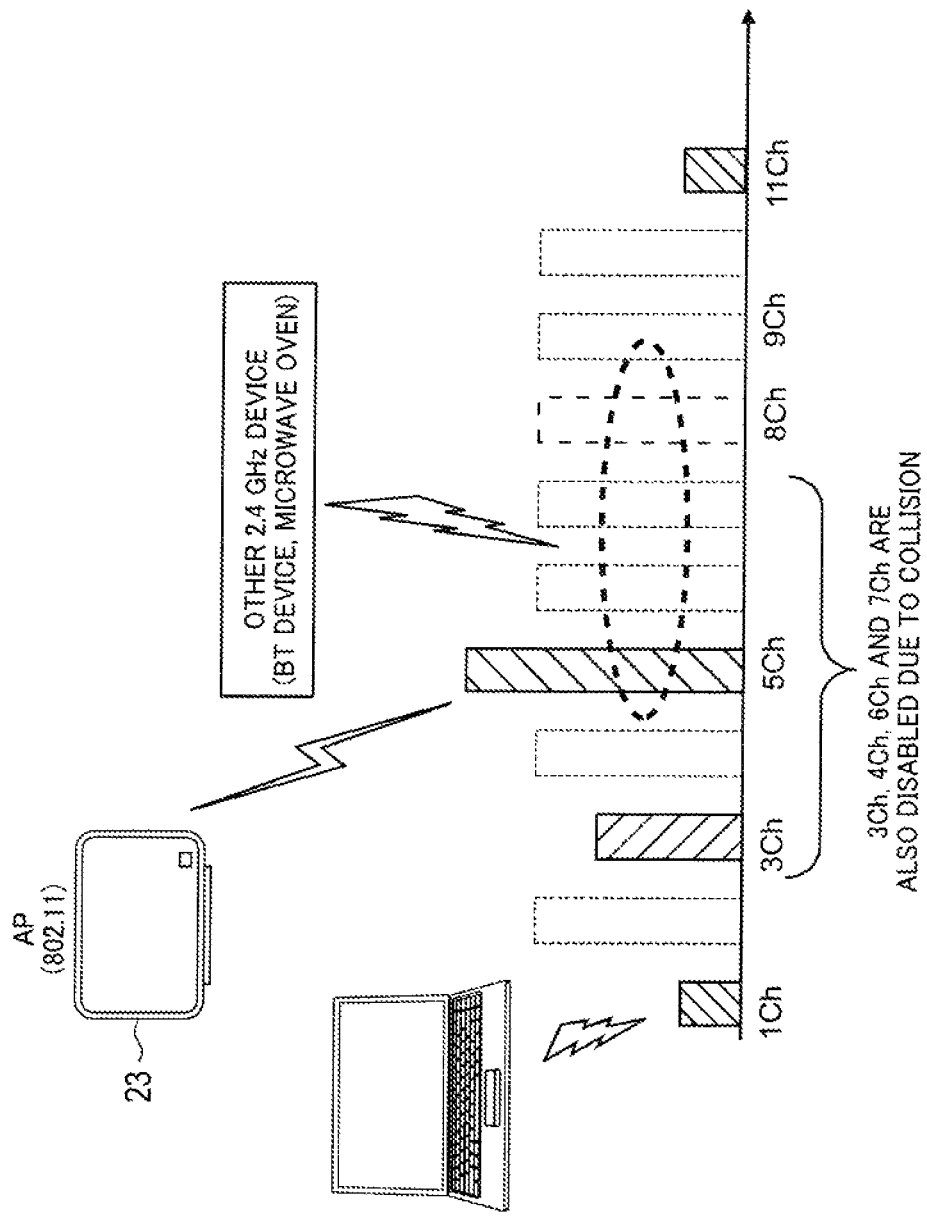
FIG. 5 illustrates an example of results of the carrier sensing operation in a wireless LAN band in the wireless communication apparatus according to the embodiment of the present invention.

FIG. 5 illustrates a wireless LAN band according to the present embodiment. In the present embodiment, a base station and portable unit of a wireless LAN of the 802.11 standard are assumed to influence communication in a band of approximately 20 MHz.

In the example of FIG. 5, another access point (AP) 23 of the 802.11 standard located nearby uses channel 5. Base unit (wireless communication apparatus) 20 of the present embodiment performs a carrier sensing operation and detects a preamble in channel 5, and further detects a beacon of the 802.11 standard, and therefore disables channel 5 (5Ch) according to clear channel assessment (CCA).

In addition, the range of influence reaches a band of 20 MHz centered on channel 5 and the received electric field strength of the signal of the other base station apparatus on channel 5 is very strong. Thus, base unit 20 increases the weighting for restricting use of a plurality of channels on both sides. Therefore, in the example of FIG. 5, base unit 20 disables two channels on the low-frequency side and two channels on the high-frequency side centered on channel 5 (a total of 5 channels from 3Ch to 7Ch).

A signal outputted from another apparatus of the 802.11 standard is also received using channel 3 and a preamble is detected. However, since the electric field strength of the signal on channel 3 is relatively weak, base unit 20 relatively reduces weighting for restricting the use of the channels on both sides and disables only one channel on the low-frequency side and one channel on the high-frequency side centered on channel 3. Therefore, base unit 20 searches for a use channel from among remaining channel 1 and channels 8 to 13.

In FIG. 5, a signal outputted from another apparatus of the 802.11 standard is also received by channel 1 and a preamble is detected. Base unit 20 also disables channel 1 according to CCA accompanied by preamble detection even when a signal source is located far and the electric field strength is very weak. Therefore, base unit 20 searches for a use channel from among remaining channels 8 to 13. A signal from another base station apparatus is also received regarding channel 11 and base unit 20 disables channel 11 according to clear channel assessment (CCA) associated with preamble detection.

A CCA detection operation is performed every time a search is performed on an individual channel during carrier sensing, and as described above, counter 15 counts up when CCA is detected. Counter 15 counts up every time a search is performed on channel 5, channel 3 and channel 1. In the example of FIG. 5, an interference radio wave by the microwave oven occurs in the frequency region over a range of channel 5 to channel 8.

Figure 6:
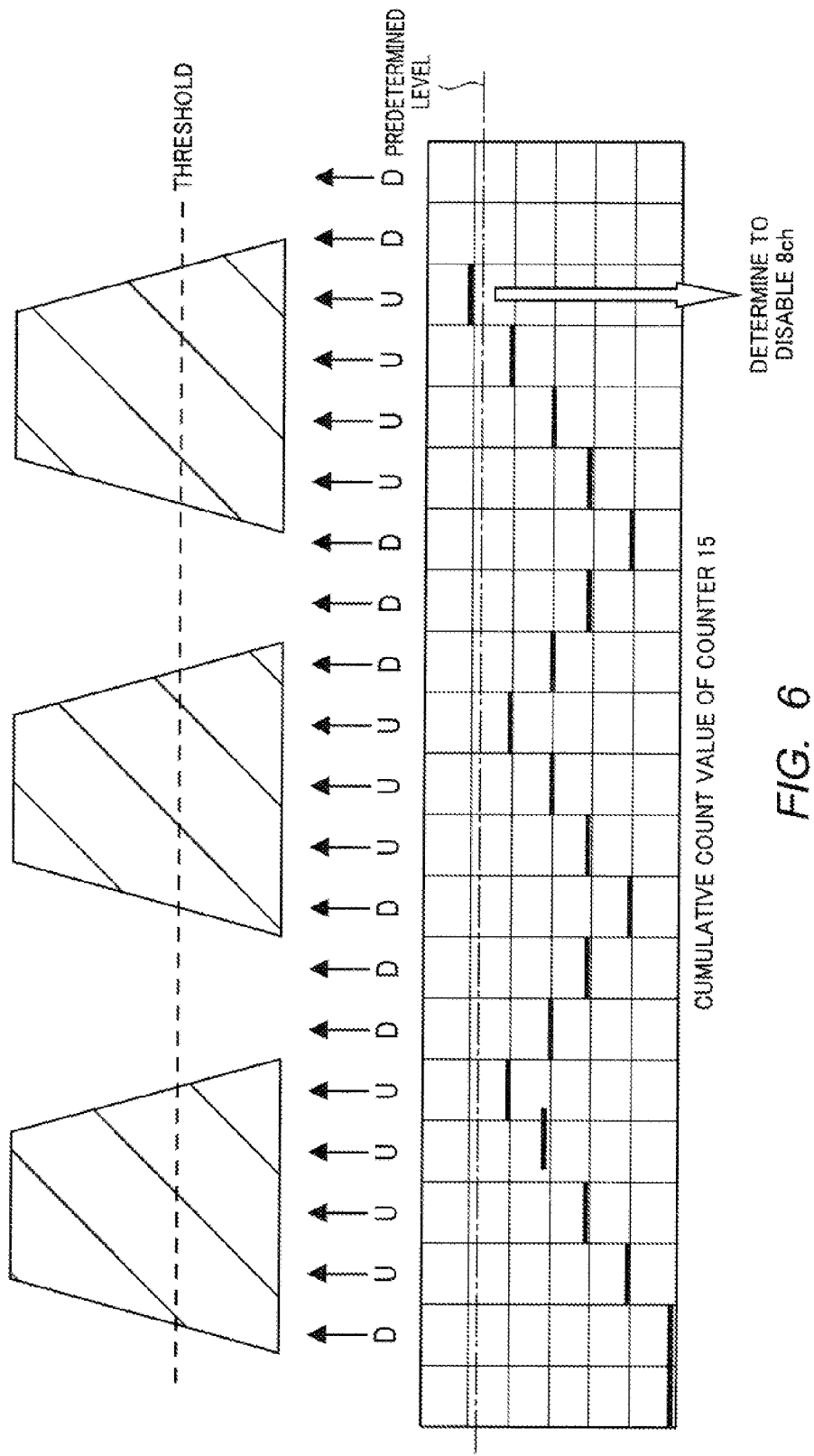
FIG. 6 illustrates an example of an interference radio wave of a microwave oven and a cumulative count value of a counter detected on a certain one channel through the carrier sensing operation of the wireless communication apparatus according to the embodiment of the present invention.

FIG. 6 illustrates an interference radio wave of a microwave oven detected using, for example, channel 8 and an example of the cumulative count value of counter 15. The microwave oven does not always emit an interfering wave. For example, on channel 8, when received wave intensity determination section 17 determines that the signal intensity has exceeded a threshold (stored in threshold storage section 18) (U), a count up instruction is sent to counter 15, and counter 15 counts up at that time. On the other hand, when received wave intensity determination section 17 determines that the signal intensity has fallen below the threshold (D), a counting down instruction is sent to counter 15 and counter 15 counts down at that time.

The cumulative count value of counter 15 is passed to communication control section 13. When the cumulative count value of counter 15 exceeds a predetermined level as shown in FIG. 6, communication control section 13 determines to disable the channel. When calculated from a conventional Dirtiness algorithm, channel 8 shown in FIG. 5 may be disabled, but channel 8 is determined to be disabled according to the cumulative count value of counter 15 of the present embodiment. Counter 15 is reset to "0" upon receiving information indicating that a preamble is detected from CCA detection section 14.

Figure 7:
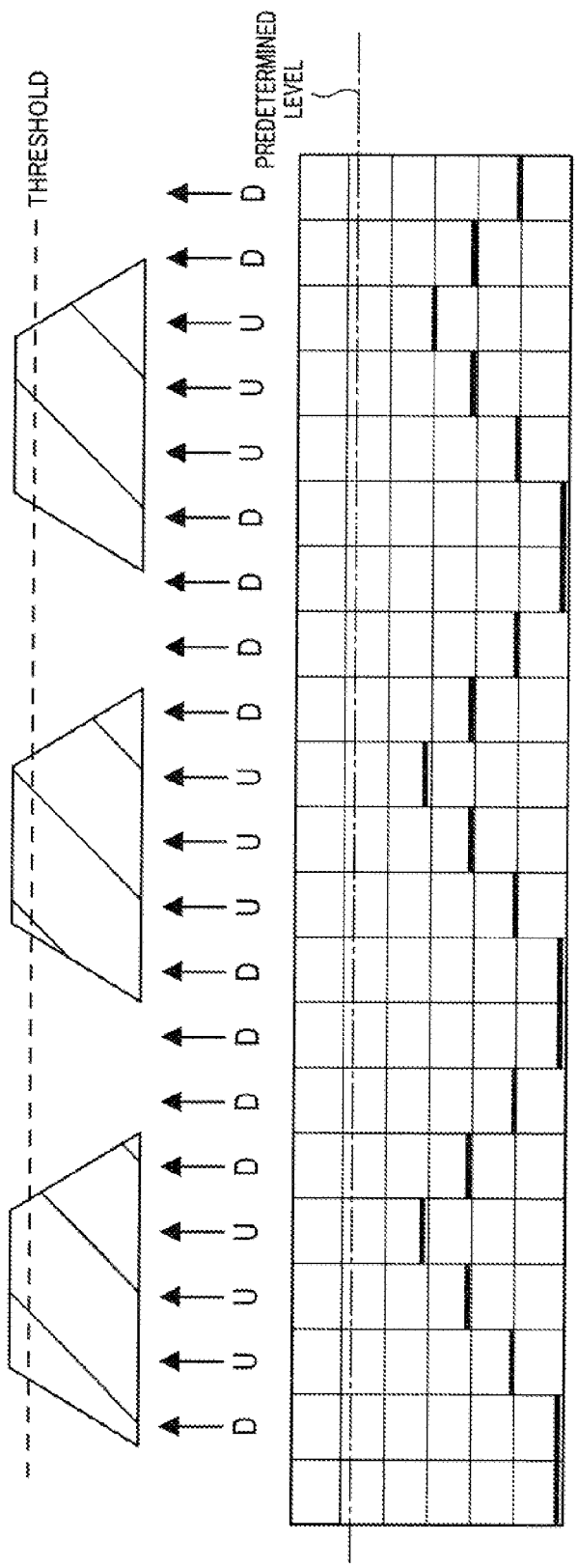
FIG. 7 illustrates an example of a cumulative count value of the counter when an interference radio wave of the microwave oven detected on a certain channel through the carrier sensing operation of the wireless communication apparatus according to the embodiment of the present invention is relatively weak.

FIG. 7 illustrates an example where an interference radio wave of a microwave oven detected using a certain channel (e.g., channel 9) is relatively weak. Counter 15 counts up when received wave intensity determination section 17 determines that the signal intensity has exceeded a threshold (U) and counts down when received wave intensity determination section 17 determines that the signal intensity has fallen below the threshold (D). In the example of FIG. 7, since the cumulative count value of counter 15 never exceeds the predetermined level, communication control section 13 determines that the channel is enabled. In the above-described example, base unit 20 according to the present embodiment performs transmission using channel 9.

As described above, in the present embodiment, received wave intensity determination section 17 makes a threshold determination on signal intensity along with a detection operation by CCA detection section 14 and updates the cumulative count value of counter 15. By so doing, base unit (wireless communication apparatus) 20 can determine whether to enable/disable the channel based on the cumulative count value of counter 15 even when CCA detection section 14 does not detect any preamble of an 802.11 standard packet, and has no possibility of selecting a channel with heavy interference, and can thereby allow a high efficiency operation.

Figure 8:
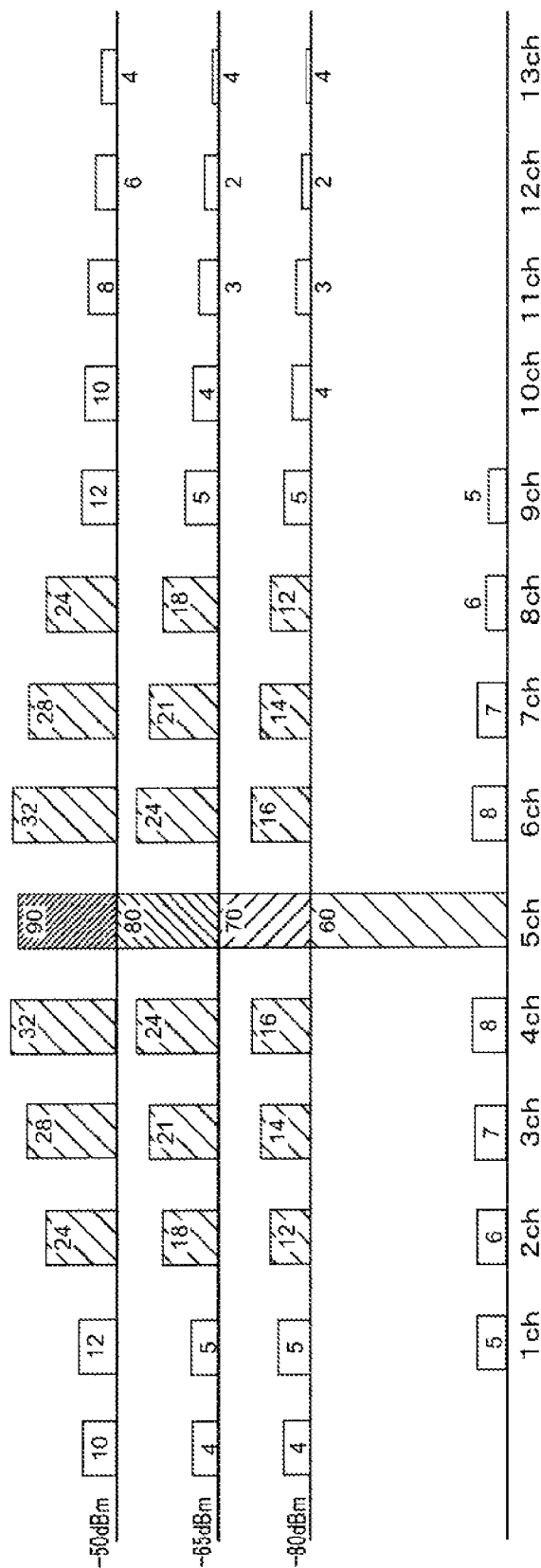
FIG. 8 illustrates a weighting table used for the carrier sensing operation in the wireless communication apparatus according to the embodiment of the present invention.

FIG. 8 schematically illustrates a weighting table provided in communication control section 13. In FIG. 8, when, for example, signal intensity of the channel (e.g., 5Ch) in which a preamble of another apparatus is detected is less than −80 dBm, a weighting parameter of the channel from which a preamble is detected is "60," a weighting parameter of the next channel (e.g., 4Ch, 6Ch) is "8," a weighting parameter of the second closest channel (e.g., 3Ch, 7Ch) is "7," and a weighting parameter of the third closest channel (e.g., 2Ch, 8Ch) is "6."

On the other hand, when the signal intensity of the channel from which a preamble is detected is −80 dBm or above and less than −65 dBm, a weighting parameter of the channel from which a preamble is detected is "70," a weighting parameter of the next channel is "16," a weighting parameter of the second closest channel is "14" and a weighting parameter of the third closest channel is "12."

When the signal intensity of the channel from which a preamble is detected is −50 dBm or above, a weighting parameter of the channel from which a preamble is detected is "90," a weighting parameter of the next channel is "32", a weighting parameter of the second closest channel is "28" and a weighting parameter of the third closest channel is "24."

Thus, the higher the signal intensity of the channel from which a preamble is detected, the larger the values of weighting parameters of channels on both sides thereof become.

The weighting parameter of the channel from which a preamble is detected and the weighting parameter of an adjacent channel selected from the weighting table are accumulated for each channel and recorded in the aforementioned weighting parameter recording section. When the cumulative value of the weighting parameters exceeds a predetermined threshold, communication control section 13 disables the channel. The stronger the signal intensity of the channel from which a preamble is detected, the greater the values of weighting parameters of the channels on both sides thereof become, and therefore the channels on both sides are more likely to be disabled. In contrast, when the signal intensity of the channel from which a preamble is detected is very weak, the values of the weighting parameters of the channels on both sides thereof are small, and therefore the channels on both sides avoid from being disabled in some cases.

Figure 9:
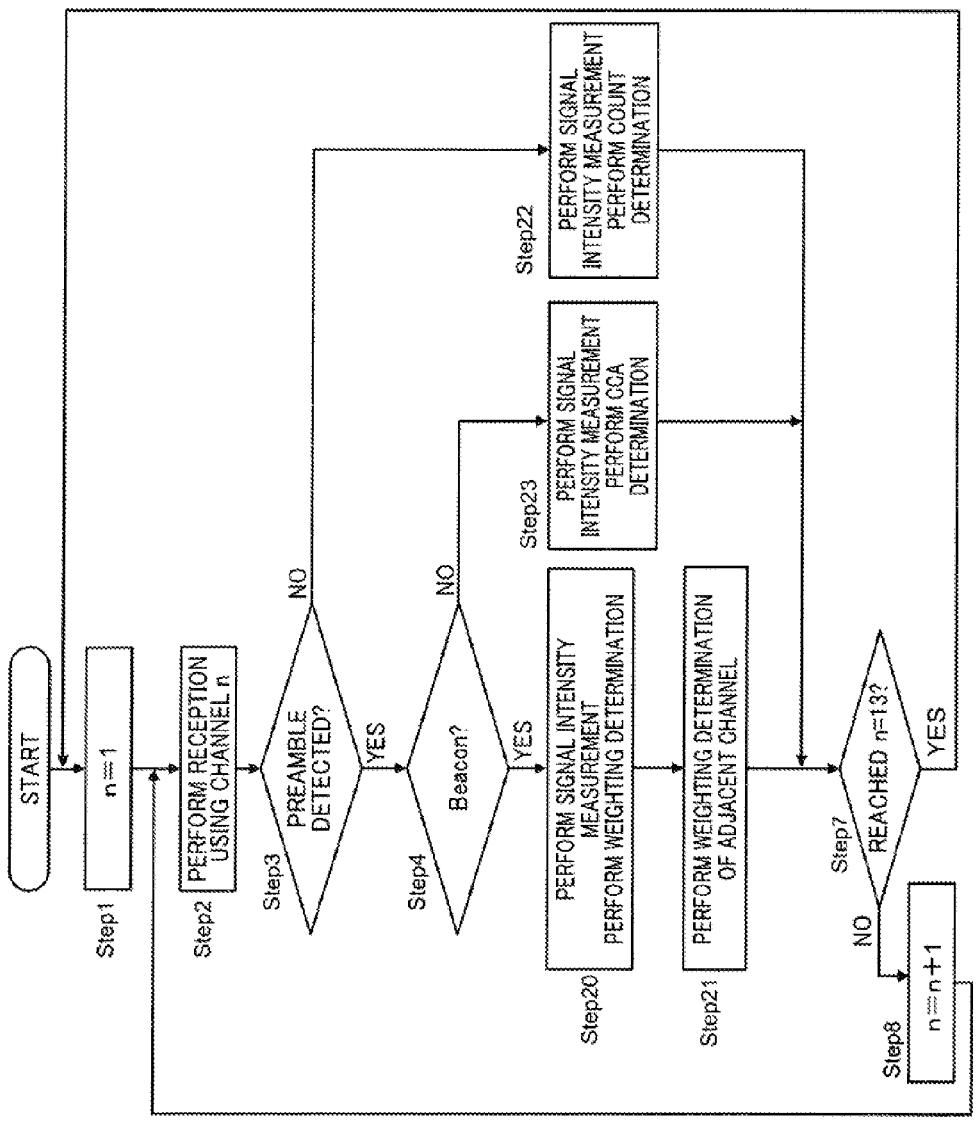
FIG. 9 is a flowchart for accurately determining a channel used in the wireless communication apparatus according to the embodiment of the present invention.

FIG. 9 is a flowchart for communication control section 13 to control the respective sections when a faulty channel is identified based on not only the aforementioned cumulative count value but also a cumulative value of weighting parameter per channel during a carrier sensing operation. In FIG. 9, n denotes a variable corresponding to a number of a receiving channel. In step 1 to step 4, and step 7 and step 8, control similar to that in FIG. 4 is performed, and therefore description thereof will be omitted.

When a preamble is detected in a certain channel in step 3, and a beacon of the 802.11 standard is also detected in step 4, signal intensity measurement and weighting determination are performed in step 20. That is, as shown in FIG. 8, when the weighting parameter of the channel from which a beacon is detected, the weighting parameters of the adjacent channels are accumulated for each channel and are recorded in the weighting parameter recording section in communication control section 13.

In step 21, whether the cumulative value of weighting parameters has exceeded a predetermined threshold or not is determined, and when there is a channel in which the cumulative value of weighting parameters exceeds a predetermined threshold, communication control section 13 disables the channel. The stronger the signal intensity of the channel from which a preamble is detected, the greater the values of weighting parameters of channels on both sides thereof become, and therefore the channels on both sides are more likely to be disabled.

In aforementioned step 3, when no preamble of the IEEE802.11 standard packet is detected in the received signal (step 3: NO), the process moves to step 22 and communication control section 13 performs signal intensity measurement and count determination. That is, in step 22, communication control section 13 requests received wave intensity determination section 17 for the determination result of the received wave intensity as in the case of step 9 shown in FIG. 4. Accordingly, received wave intensity determination section 17 determines whether the received wave intensity has exceeded a threshold or not as described above, passes the determination result to counter 15 and counter 15 counts up or counts down. Communication control section 13 acquires the cumulative count value from counter 15 and determines whether to enable/disable the channel based on the cumulative count value. In step 22, communication control section 13 records information "enabled" regarding the channel if the channel is enabled and records information "disabled" if the channel is disabled, and moves to step 7.

In aforementioned step 4, when no beacon of the IEEE802.11 standard packet is detected in the received signal (step 4: NO), the process moves to step 23, communication control section 13 reads a cumulative CCA value regarding the channel recorded in the cumulative CCA value recording section and determines whether to enable/disable the channel based on the cumulative CCA value. Communication control section 13 records information "disabled" regarding the channel when the cumulative CCA value exceeds a predetermined value, records information "enabled" when the cumulative CCA value does not exceed the predetermined value and moves to step 7.

Thus, in the control in FIG. 9, communication control section 13 determines whether to enable/disable the channel based on not only the cumulative count value but also a cumulative value of weighting parameters for each channel and a cumulative CCA value. This allows an appropriate channel to be selected while avoiding interference as much as possible.

Figure 10:
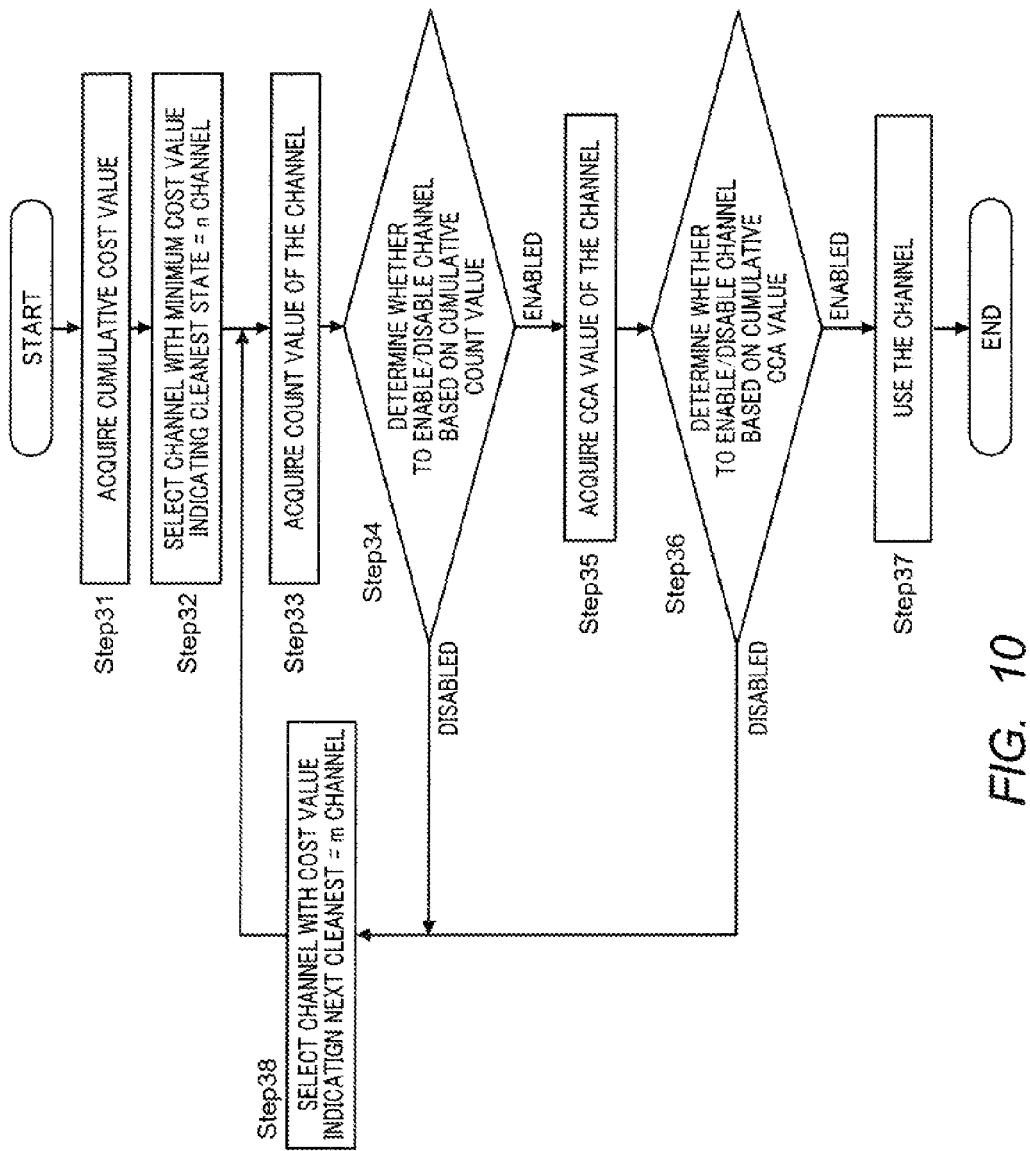
FIG. 10 is a flowchart for accurately determining a channel used in the wireless communication apparatus according to the embodiment of the present invention.

FIG. 10 illustrates a flowchart for control performed by communication control section 13 in order to accurately determine priority of a use channel based on the aforementioned cumulative count value, cumulative cost value and the cumulative CCA value during a carrier sensing operation.

In FIG. 10, communication control section 13 reads a cumulative cost value in step 31. In step 32, communication control section 13 selects a channel indicating a minimum cost value indicating the cleanest state (=n channel), based on this cumulative cost value. In step 33, communication control section 13 acquires the cumulative count value of the channel from counter 15 and determines whether to enable/disable the channel based on the cumulative count value in step 34.

When the channel (n channel) is determined to be "enabled" in step 34, communication control section 13 reads the cumulative CCA value of the channel in step 35. In step 36, communication control section 13 finally determines whether to enable/disable the channel based on the cumulative CCA value regarding the channel. In step 36, when the channel is determined to be "enabled," communication control section 13 starts communication using the channel (n channel) in step 37.

When the channel is determined to be "disabled" in aforementioned step 34 or "disabled" in step 36, communication control section 13 reads the cumulative cost value in step 38 and then selects a channel with the cost value indicating the next cleanest state (m channel). The process then returns to step 33, communication control section 13 acquires a cumulative count value of a channel with the cost value indicating the next cleanest state (m channel) regarding the channel in step 33 and determines whether to enable/disable the channel based on the cumulative count value in step 34.

Thus, a determination based on a cumulative count value or a determination based on a cumulative CCA value is preferentially made on a channel with a cumulative cost value indicating a cleaner state, which provides higher processing efficiency.

Figure 11:
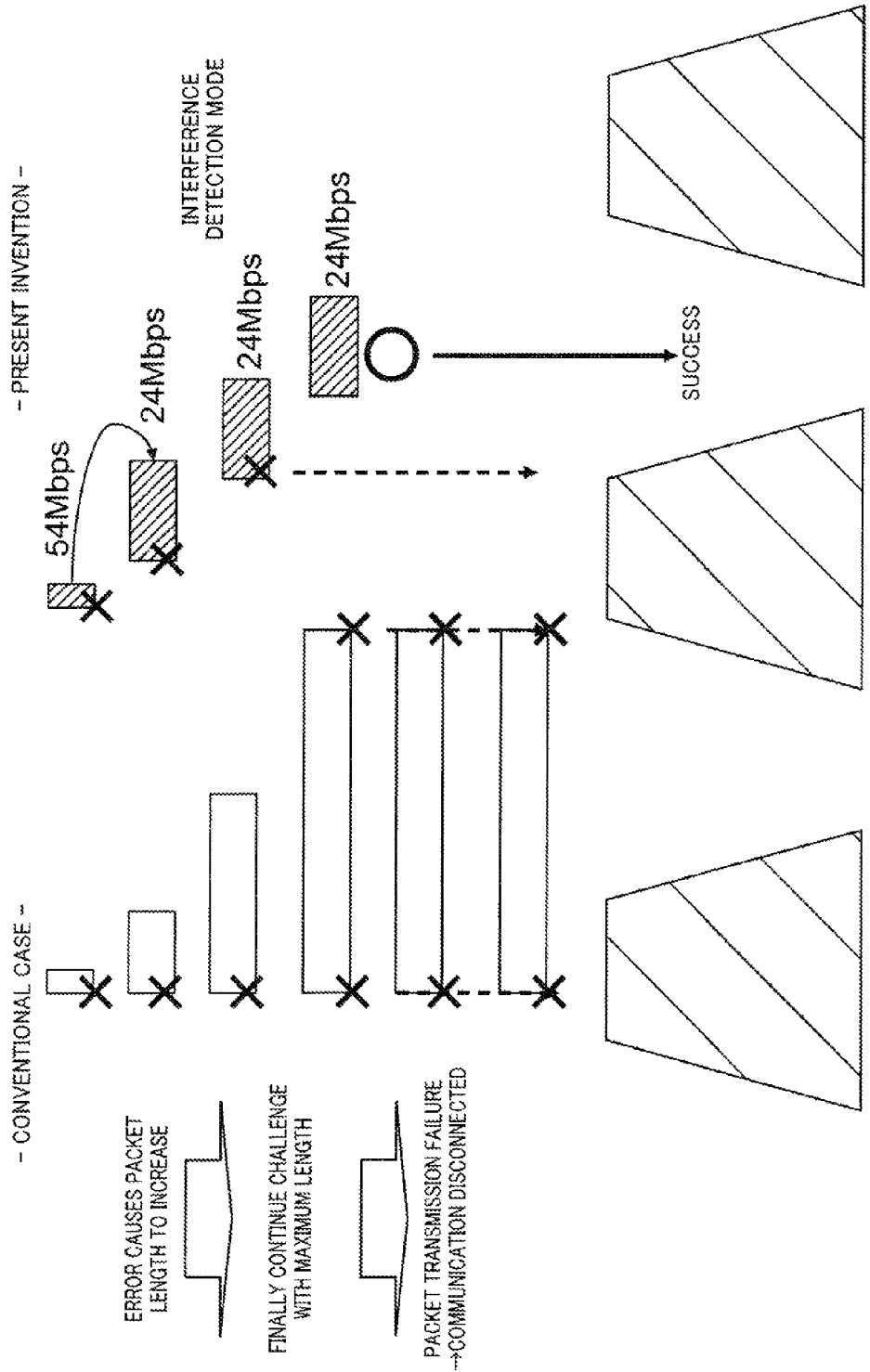
FIG. 11 illustrates effects of an interference detection mode of the wireless communication apparatus according to the embodiment of the present invention.

Hereinafter, an embodiment which combines an interference detection mode and a weak electric field mode will be described. For example, a microwave oven does not always emit an interfering wave as described above, but there is an OFF time zone even during operation as shown in FIG. 11. In an 802.11 standard communication, when an error occurs as shown on the left side of FIG. 11, transmission is performed next time with a reduced transmission rate, and therefore the packet length increases as the speed decreases. Repetition of errors causes the transmission rate to further decrease, causing the packet length to gradually increase, ending up continuing to try to transmit the packet with the maximum length and determines that packet transmission has failed if it is still impossible to eliminate errors, and disconnects communication. Thus, conventionally, even when the interference source is a microwave oven and an OFF time zone exists during operation, if the maximum packet length is adopted, the probability that the packet may be affected by interference is high and the probability of success is low.

Upon detecting an error as shown on the right side of FIG. 11, base unit (wireless communication apparatus) 20 according to the present embodiment is switched to an interference detection mode and reduces the transmission rate to a predetermined appropriate rate (e.g., 24 Mbps) at once instead of continuing to gradually reduce the transmission rate over time and repeats retransmission while maintaining the once reduced transmission rate. For example, in order to transmit a packet during an OFF time zone of the microwave oven, the minimum transfer rate which is a one stage reduced transmission rate is preferably set to 5.5 Mbps.

However, the transmission rate is adjusted so as not to fall below the level at which the packet can be transferred during a Burst-OFF time of the interference source.

On the other hand in the 2.4 GHz band, in a house surrounded by thick concrete, multipath is strong and when a portable communication apparatus is carried around, the electric field strength drastically changes even with a small positional change, and communication is easily disconnected. When an error occurs as shown on the left side of FIG. 12, the transmission rate of communication of the 802.11 standard is normally reduced to allow the communicating party to receive a packet more easily.

In the conventional 802.11 communication, the transmission rate is gradually reduced when errors occur continuously, but it takes time until the transmission rate is reduced to a degree at which the communicating party can actually perform reception, and even if the retransmission count reaches a predetermined count, it is often the case that the retransmission fails without success. Especially when the aforementioned multipath occurs, the electric field strength drastically fluctuates even with a small positional change, resulting in disconnection of the link without being able to respond to the multipath.

Figure 12:
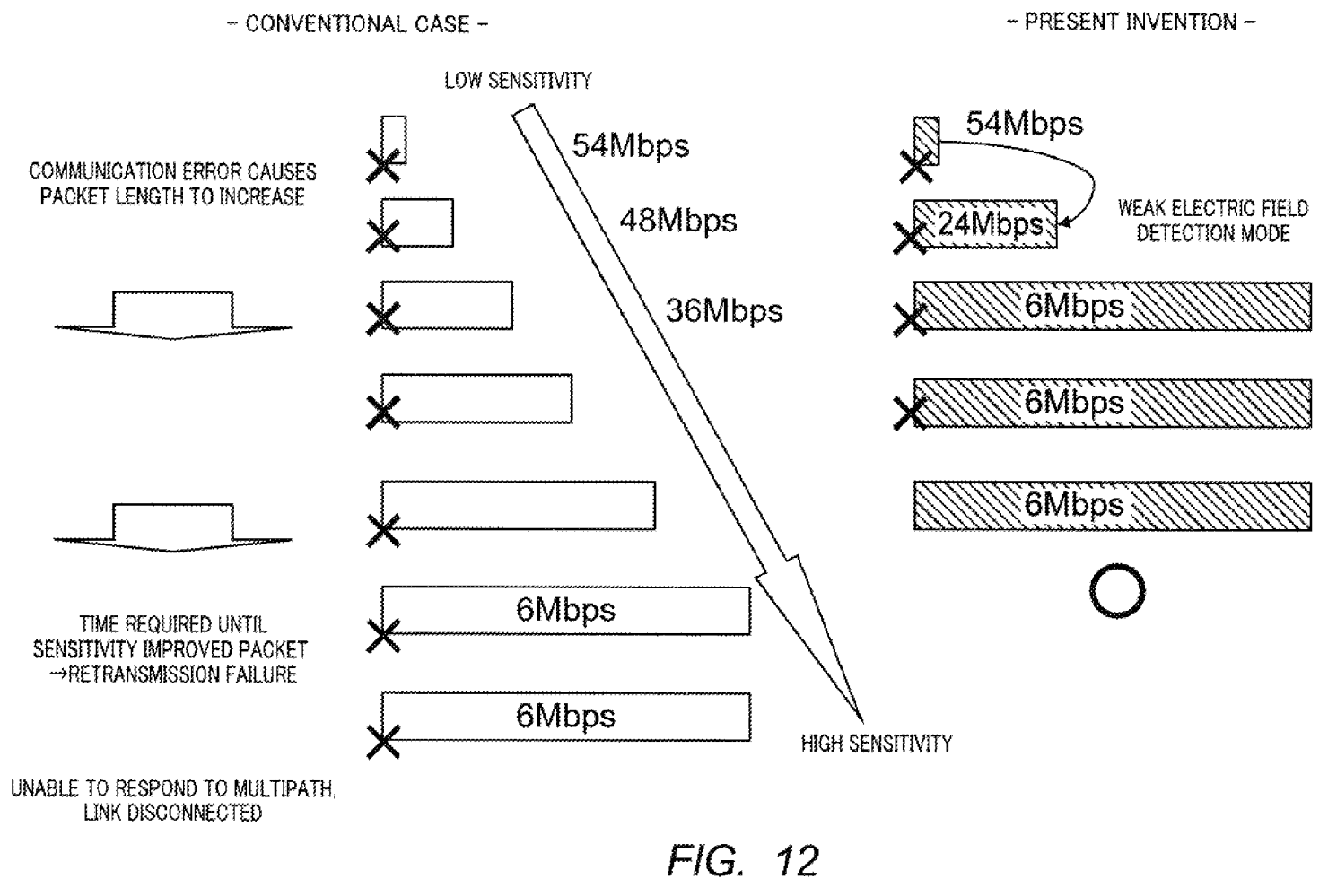

As shown on the right side of FIG. 12, upon detecting an error during transmission, base unit (wireless communication apparatus) 20 according to the present embodiment switches to a weak electric field detection mode. In this weak electric field detection mode, the transmission rate is reduced in not small but relatively large widths (in greater packet length) to retransmit a packet. When errors are not solved even if the transmission rate is reduced once, base unit 20 further reduces the transmission rate in greater widths and performs retransmission and continues retransmission a predetermined number of times even if the transmission rate reaches a minimum transmission rate (6 Mbps).

Figure 13:
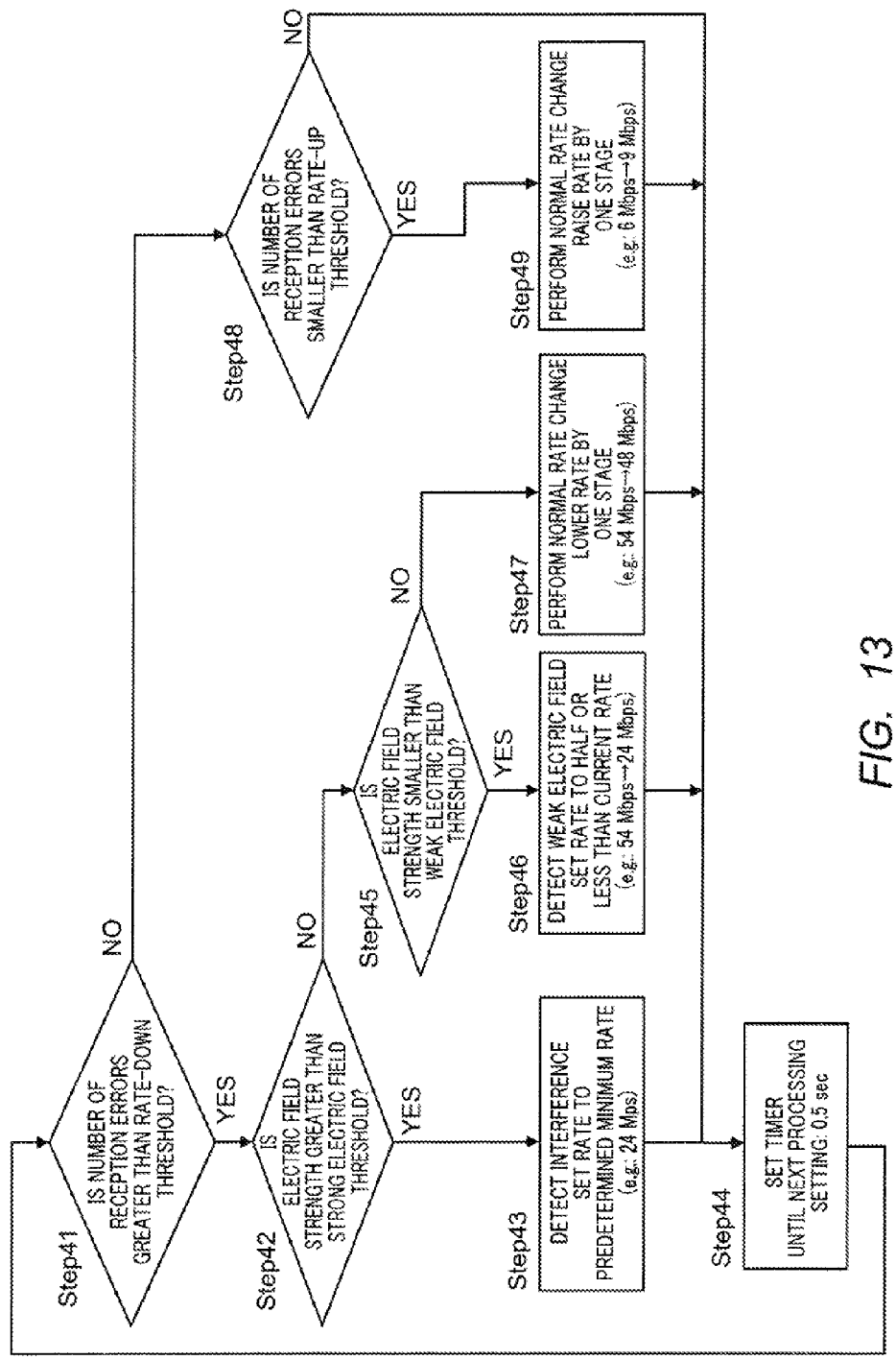
FIG. 13 is a flowchart for changing and controlling a transmission rate of the wireless communication apparatus according to the embodiment of the present invention.

FIG. 13 illustrates a flowchart for communication control section 13 to control an interference detection mode and a weak electric field detection mode in combination so as to be able to flexibly deal with both a interfering wave of a microwave oven or the like and multipath during communication. Communication control section 13 flexibly selects whether to receive information relating to reception errors from reception baseband signal processing section 8 and determination information of electric field strength from received wave intensity determination section 17, reduce the transmission rate at a time as shown below and maintain the transmission rate or reduce the transmission rate in large widths, increase the packet length and transmit the packet or gradually reduce the transmission rate as usual.

In FIG. 13, in step 41, communication control section 13 determines whether the number of reception errors is greater than a rate-down threshold or not. When the number of reception errors is greater than the rate-down threshold (step 41: YES), communication control section 13 determines in step 42 whether the electric field strength is greater than a strong electric field threshold or not. When the electric field strength is greater than the strong electric field threshold (step 42: YES), communication control section 13 determines that there is a high possibility that the electric field strength may be receiving an interference wave of a strong electric field, and sets the transmission rate to a minimum rate (e.g., 24 Mbps) in step 43.

In step 44, communication control section 13 sets a timer until the next processing in order to perform processing of changing the rate at a predetermined period and performs a waiting operation (e.g., 0.5 sec). When the predetermined waiting time elapses, communication control section 13 returns to step 41, and determines the number of reception errors.

As described above, when a state continues in which the number of reception errors is greater than the rate-down threshold and the electric field strength is greater than the strong electric field threshold, an interference detection mode is set and data is transmitted again at the same minimum transmission rate (e.g., 24 Mbps) thereafter, too.

In step 41, even when the number of reception errors is greater than the rate-down threshold (step 41: YES), if the electric field strength is smaller than the strong electric field threshold in step 42 (step 42: NO), communication control section 13 determines in step 45 whether the electric field strength is smaller than the weak electric field threshold or not.

When the electric field strength is smaller than the weak electric field threshold in step 45 (step 45: YES), communication control section 13 determines that there is a high possibility that multipath may have occurred and sets the transmission rate to half or less than the current level in step 46. For example, when the current transmission rate is 54 Mbps, 24 Mbps or 12 Mbps or the like which is half or less than the current level is set in step 46. Communication control section 13 waits for the next processing in step 44 (e.g., 0.5 sec), and returns to step 41 when a predetermined waiting time elapses.

The weak electric field detection mode is set in this way when a state continues in which the number of reception errors is relatively large (larger than the rate-down threshold) and the electric field strength is relatively small (smaller than the strong electric field threshold), and a change of switching the transmission rate to half the current level as long as this state continues is repeated and the transmission rate is reduced to, for example, 6 Mbps as shown in FIG. 12.

Note that when the electric field strength is greater than the weak electric field threshold in step 45 (step 45: NO), communication control section 13 determines that there is a low possibility that multipath may have occurred and reduces the transmission rate by one stage in step 47 (e.g., 54 Mbps→48 Mbps, 48 Mbps→36 Mbps) as usual.

In step 48, communication control section 13 determines whether the number of reception errors is smaller than a rate-up threshold or not. When the number of reception errors is smaller than the rate-up threshold (step 48: YES), communication control section 13 determines that there is neither interfering wave of the strong electric field nor multipath, and the transmission rate is raised by one stage in step 49 (e.g., 6 Mbps→9 Mbps, 36 Mbps→48 Mbps) as usual. When the number of reception errors is determined to be greater than the rate-up threshold in step 48 (step 48: NO), communication control section 13 does not change the transmission rate.

As described above, when the number of reception errors is greater than the rate-down threshold and the electric field strength exceeds the weak electric field threshold, the transmission rate is reduced once by setting a relatively high value (e.g.: 24 Mbps) to be a minimum value. After that, base unit (wireless communication apparatus) 20 repeats transmission with the fixed packet length, which allows the number of transmissions per unit time to be maintained at a relatively high level. This increases the possibility that packet transmission timing may coincide with valleys where the electric field strength of the interference source decreases (e.g., time zone in which the microwave oven is OFF), with the result that packet transmission is more likely to be enabled before packet transmission is determined to be a failure even when a microwave oven or the like is operating nearby.

Figure 14:
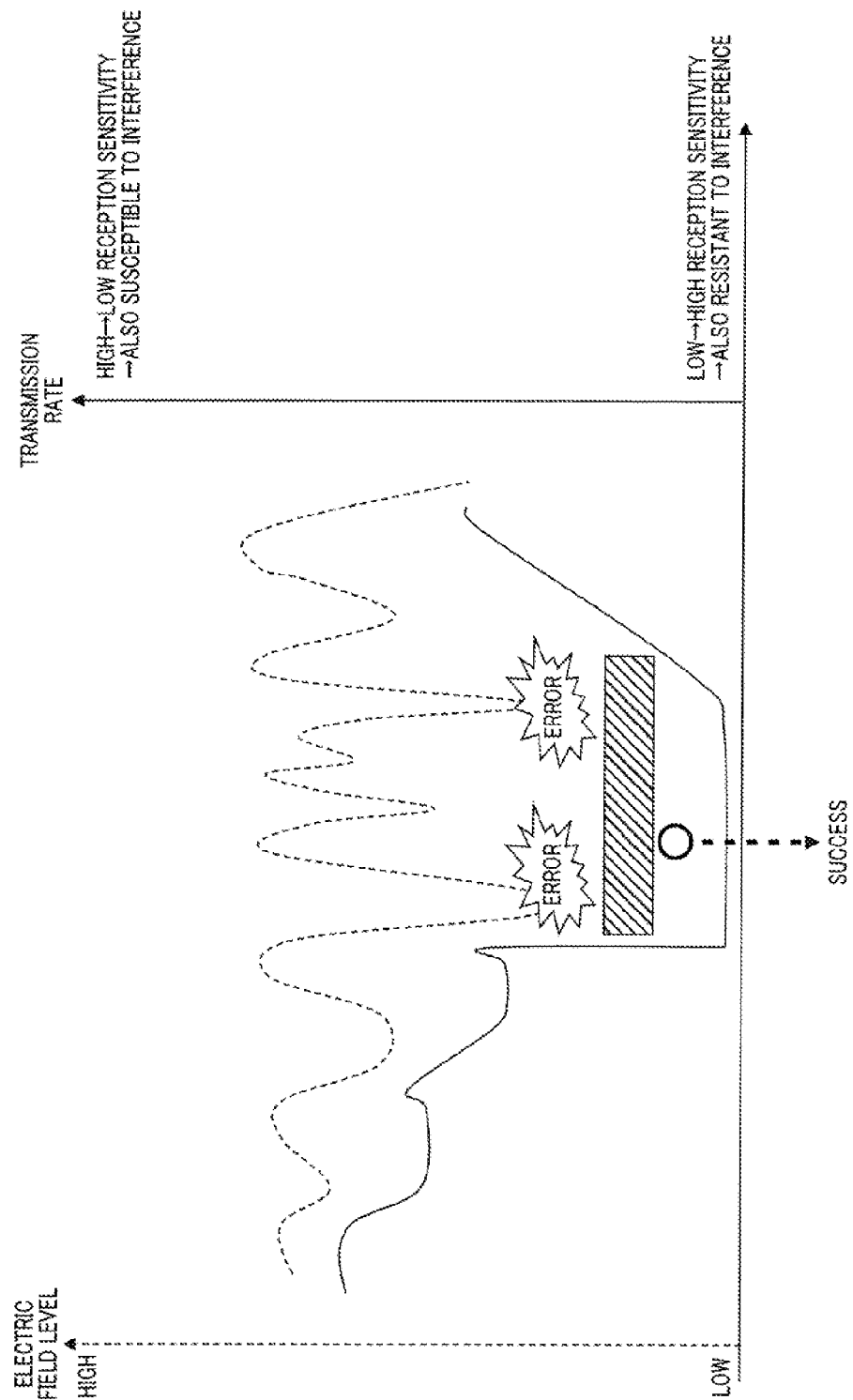
FIG. 14 illustrates effects of the weak electric field detection mode of the wireless communication apparatus according to the embodiment of the present invention.
Figures 15A, 15B:
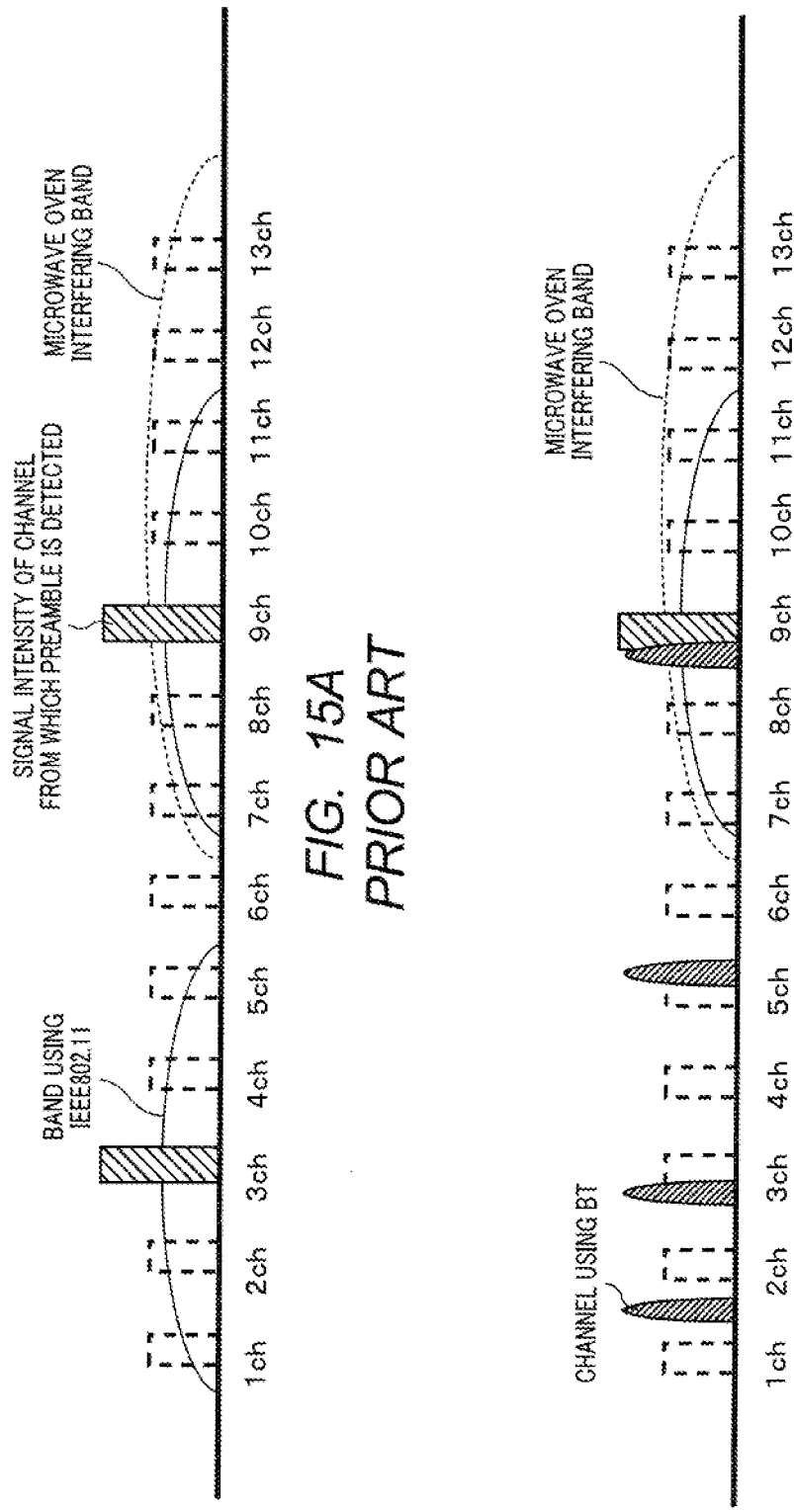
FIGS. 15A and 15B illustrate a 2.4 GHz band used according to the 802.11 standard.

In addition, when a portable communication apparatus is carried around in places where multipath is likely to become stronger, a state often continues in which the electric field strength drastically fluctuates. However, when a state continues in which the number of reception errors is greater than the rate-down threshold and the electric field strength does not exceed the weak electric field threshold, the present embodiment significantly reduces the transmission rate as shown in FIG. 14, thus causing the transmission rate to change to a transmission rate at which the communicating party can actually receive in a short time, thereby increasing the possibility of success in communication. This makes it possible to quickly respond to multipath that occurs suddenly.

INCORPORATION BY REFERENCE

The present application claims the priority from Japanese Patent Applications No. 2013-136768 filed on Jun. 28, 2013, No. 2013-136756 filed on Jun. 28, 2013 and No. 2013-136766 filed on Jun. 28, 2013, the entire contents of which are hereby incorporated by reference into this application.

INDUSTRIAL APPLICABILITY

The present invention makes it possible to select a best channel even in a situation in which a radio wave including a mixture of a variety of radio waves from apparatuses including a microwave oven is detected. The present invention is applicable to an access point, repeater, portable terminal or the like capable of reducing the influence of interference.

REFERENCE SIGNS LIST

1 Transmitting and receiving antenna
2 Transmission and reception switching circuit
3 Receiving circuit
4 Transmitting circuit
5 Reception frequency conversion section
6, 11 Bandpass filter
7 Radio demodulation section
8 Reception baseband signal processing section
9 Transmission baseband signal processing section
10 Modulation section
12 Transmission frequency conversion section
13 Communication control section
14 CCA detection section
15 Counter
16 Reception level detection section
17 Received wave intensity determination section
18 Threshold storage section
20 Base unit
21 Portable unit
22 PSTN channel
23 Access point (AP)
24 Smartphone
25 Bluetooth device
26 Microwave oven

The invention claimed is:

1. A channel determination method in a carrier sensing operation performing a signal receiving operation while switching between reception frequencies of a receiving section, the method comprising:
   detecting a predetermined preamble in received data during the carrier sensing operation;
   detecting, when the predetermined preamble is detected, whether or not a received signal is a predetermined beacon;
   disabling, when the predetermined preamble is detected in the received data and the received signal is detected to be the predetermined beacon, the channel from which the preamble is detected;
   disabling a number of channels adjacent to the channel from which the preamble is detected, the number corresponding to a signal level of the signal from which the preamble is detected;
   determining, when the predetermined preamble is not detected in the received data, whether or not electric field strength of the received signal exceeds a predetermined threshold;
   causing the counter to count up when the electric field strength of the received signal exceeds the predetermined threshold and causing the counter to count down when the electric field strength of the received signal does not exceed the predetermined threshold for each channel; and
   disabling each channel when the count value of the counter of a corresponding one of the channels reaches a predetermined value.

2. A channel determination method in a carrier sensing operation performing a signal receiving operation while switching between reception frequencies of a receiving section, the method comprising:
   detecting a predetermined preamble in received data during the carrier sensing operation;
   detecting, when the predetermined preamble is detected, whether or not a received signal is a predetermined beacon;
   accumulating a clear channel assessment (CCA) value calculated based on information on signal intensity of the received signal relating to the channel from which the preamble is detected and recording the accumulated CCA value as a cumulative CCA value in a recording section;
   disabling, when the predetermined preamble is detected in the received data and the received signal is detected to be the predetermined beacon, the channel from which the preamble is detected;
   disabling a number of channels adjacent to the channel from which the preamble is detected, the number corresponding to a signal level of the signal from which the preamble is detected; and
   determining, based on the cumulative CCA value, whether to enable or disable a channel from which the predetermined preamble is detected in the received data and in which the received signal is not detected to be the predetermined beacon.

* * * * *